Oct. 22, 1963  H. R. PAYNE ETAL  3,107,812
DISPENSING MECHANISM FOR ARTICLES IN STAGGERED STACK
Filed March 24, 1961  6 Sheets-Sheet 1
FIG. 1.
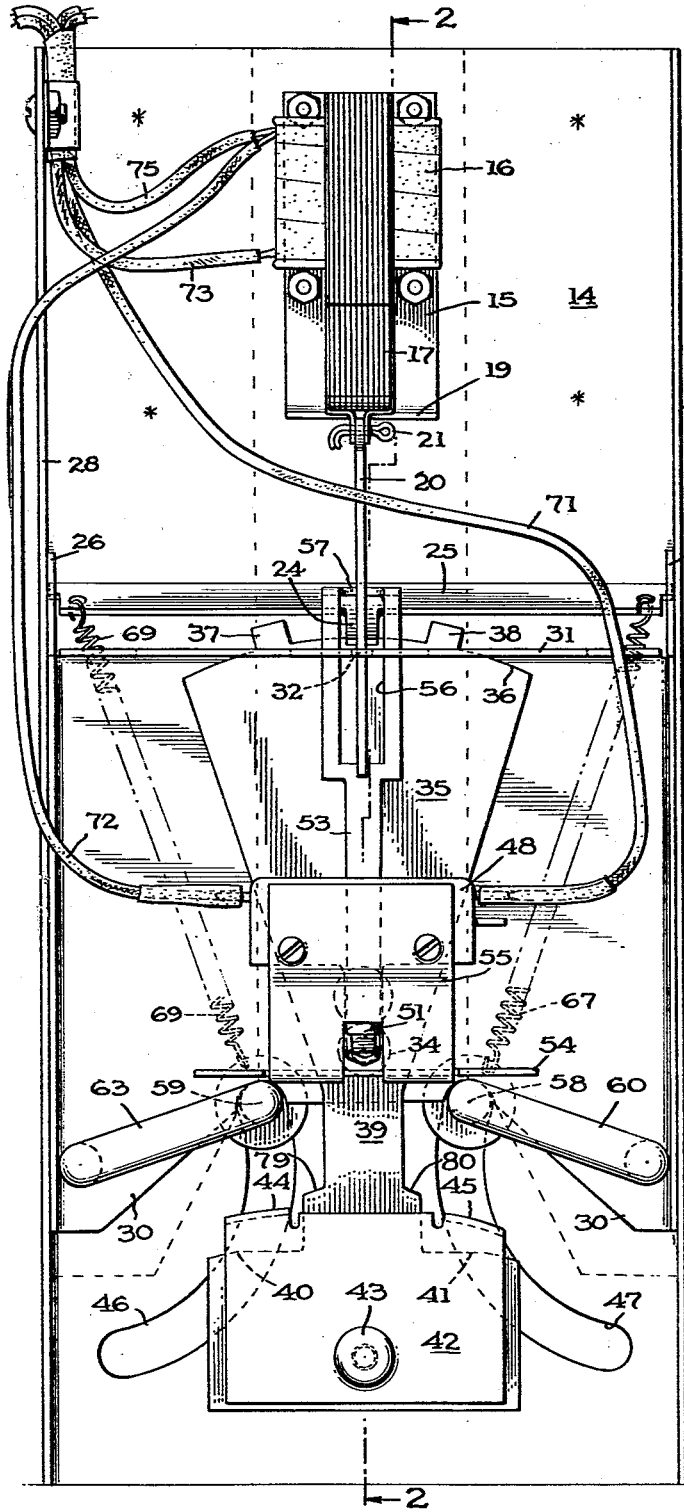
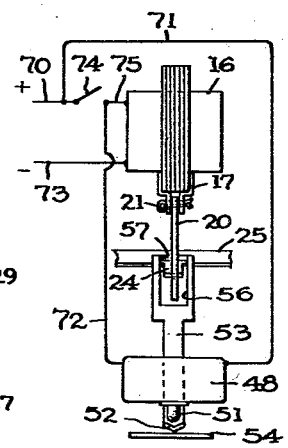
FIG. 10.
INVENTORS
HARRY R. PAYNE
JACK M. WOMACK
BY
Cameron, Kerkam & Sutton
ATTORNEYS

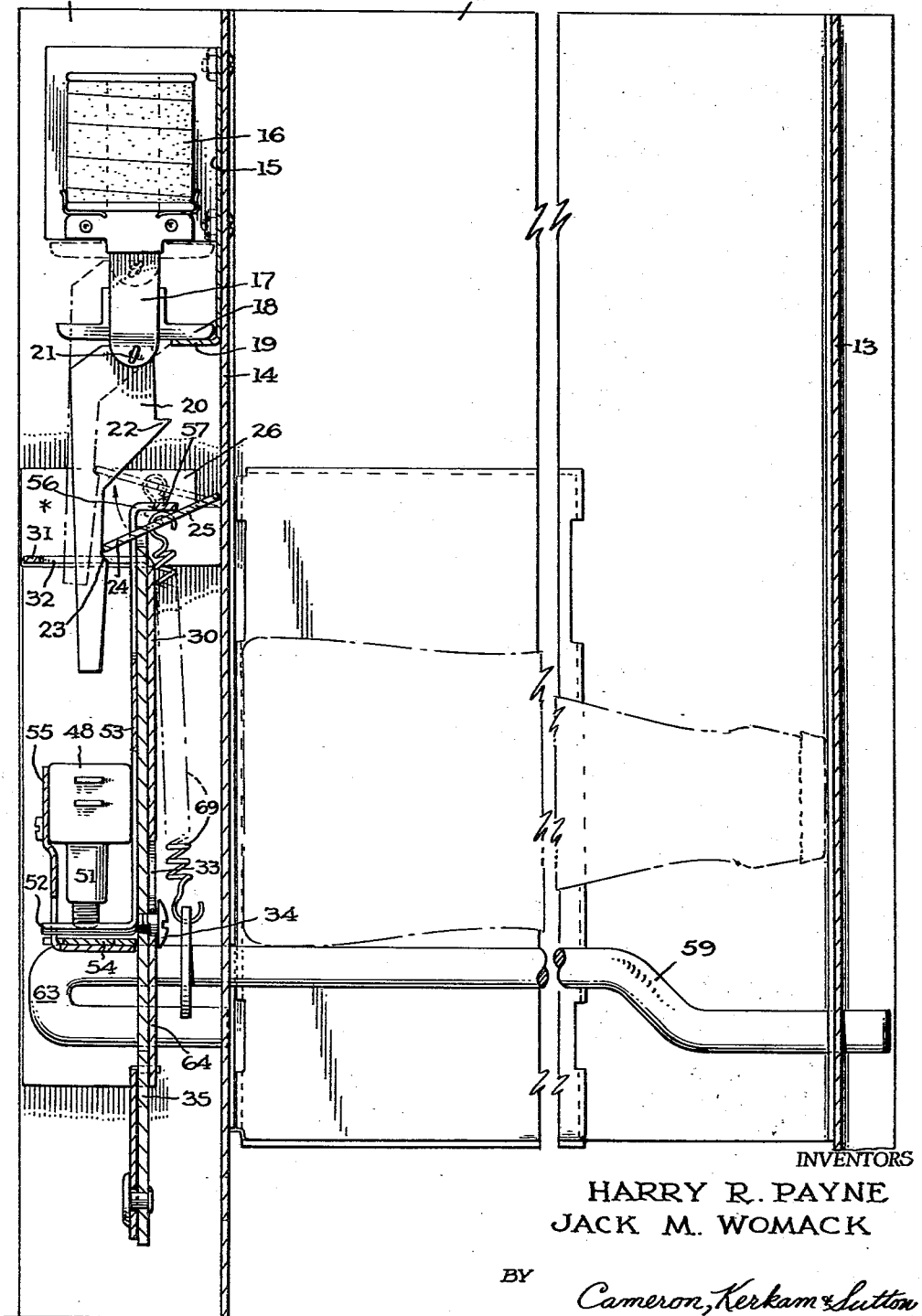

INVENTORS
HARRY R. PAYNE
JACK M. WOMACK
BY Cameron, Kerkam & Sutton
ATTORNEYS

Oct. 22, 1963    H. R. PAYNE ETAL    3,107,812
DISPENSING MECHANISM FOR ARTICLES IN STAGGERED STACK
Filed March 24, 1961    6 Sheets-Sheet 4

INVENTORS
HARRY R. PAYNE
JACK M. WOMACK

BY *Cameron, Kerkam & Sutton*
ATTORNEYS

FIG. 6.
FIG. 7.
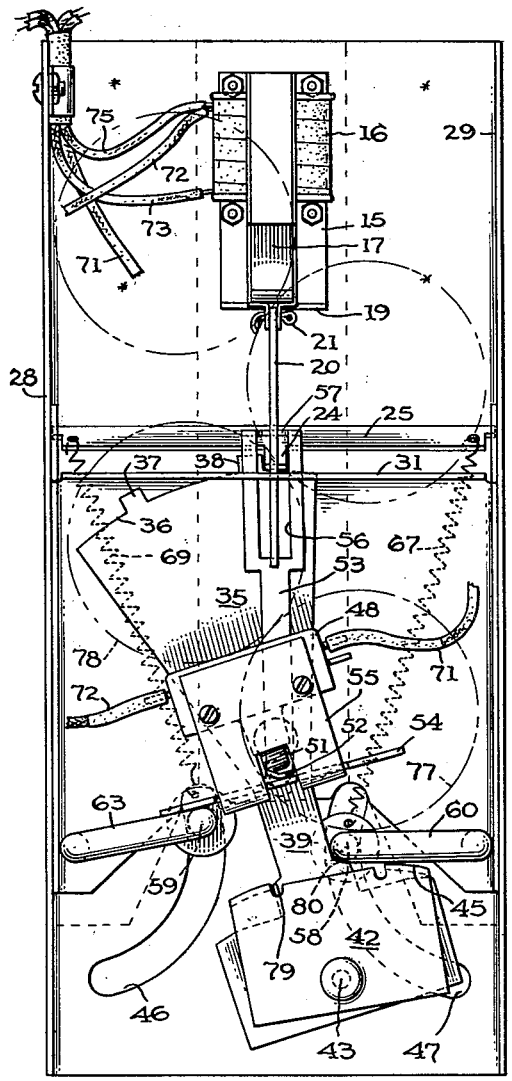
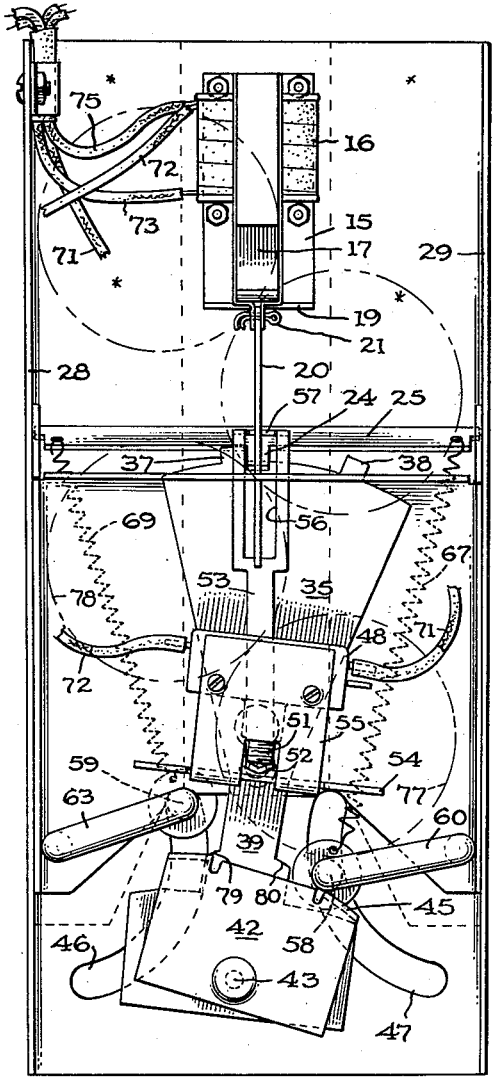
INVENTORS
HARRY R. PAYNE
JACK M. WOMACK
BY Cameron, Kerkam & Sutton
ATTORNEYS

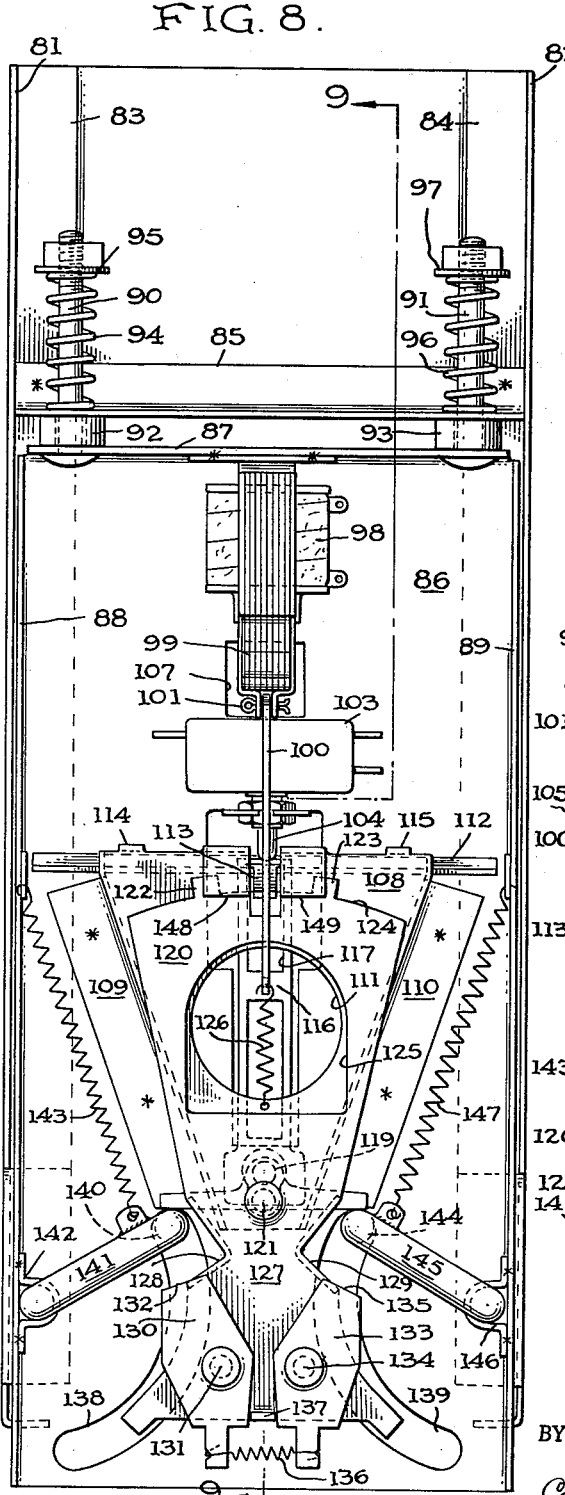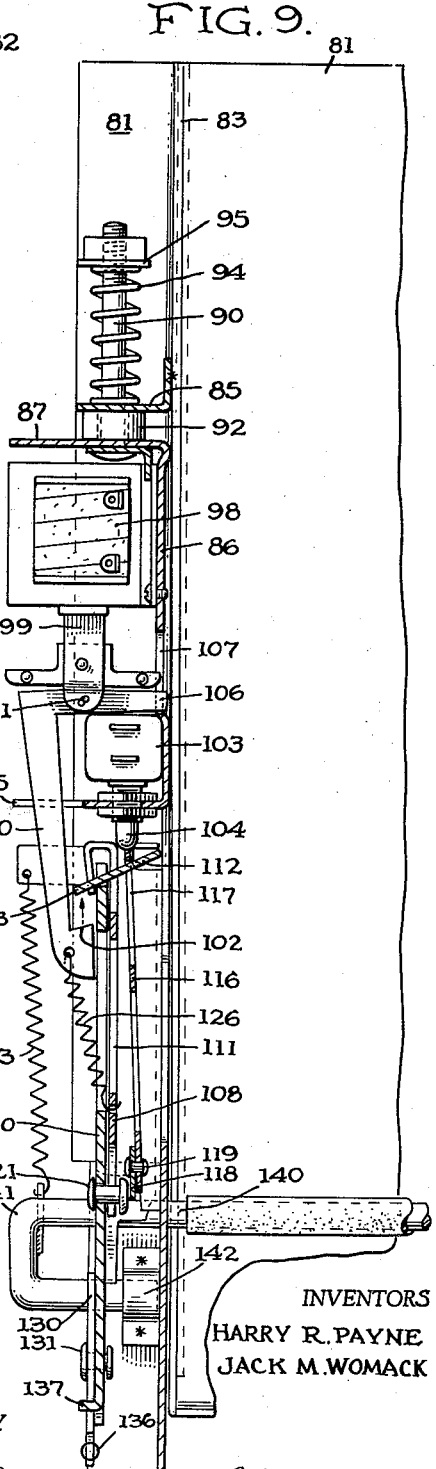
INVENTORS
HARRY R. PAYNE
JACK M. WOMACK
BY
Cameron, Kerkam & Sutton ATTORNEYS

United States Patent Office 3,107,812
Patented Oct. 22, 1963

3,107,812
DISPENSING MECHANISM FOR ARTICLES
IN STAGGERED STACK
Harry R. Payne and Jack M. Womack, Chattanooga,
Tenn., assignors to Cavalier Corporation, Chattanooga,
Tenn., a corporation of Tennessee
Filed Mar. 24, 1961, Ser. No. 98,062
14 Claims. (Cl. 221—67)

This invention relates to dispensing mechanism for dispensing a single article at a time from a plurality of articles arranged in a staggered stack.

Even more particularly this invention relates to mechanism for dispensing a single article at a time from a staggered stack of articles in which the dispensing mechanism is actuated by the weight of the articles in the staggered stack of articles and release of the dispensing mechanism for dispensing a single article at a time from the staggered stack of articles is actuated by electrically energized means.

Even more particularly still this invention relates to a dispensing mechanism for dispensing one at a time an article such as a single can or bottle from a staggered stack of articles, cans or bottles, hereinafter referred to for convenience as bottles, in which the weight of the bottles in the stack actuates the dispensing mechanism and the mechanism is released for the dispensing of a bottle by electrically energized means which may be energized from any suitable source and controlled by any suitable switch mechanism which switch mechanism may preferably be actuated by the deposit of a coin.

At the present time articles such as bottles of popular beverages are usually stored for selective sale in refrigerated cabinets with coin release mechanisms for dispensing one bottle at a time. In these cabinets the bottles may be disposed on sloping shelves arranged one shelf above the other or the bottles may be arranged in vertical staggered stacks in side by side bins. In the first type of dispenser in which the bottles are arranged on sloping shelves the lowermost bottle on each shelf may move by gravity to a position where it can be withdrawn manually by the purchaser after a coin has been deposited to release an unlocking mechanism allowing withdrawal of one bottle at a time.

In the second type of apparatus in which the bottles are arranged vertically in columns in staggered stacks in side by side bins various devices have been used for releasing one bottle at a time on the deposit of a suitable coin. Usually this release mechanism is driven by an electric motor and moves from beneath one bottle in the selected column in the selected staggered stack to a position beneath the next bottle to prevent more than one bottle from being dispensed at a time.

The first type of dispenser has advantages of relatively simple construction and the merchandise is visible for selection by the purchaser. A variety of types of beverage can be sold in this machine depending only on the number of vertical shelves provided. This multiplicity of variety is disadvantageous to the bottler who may place the machine on location since the machine can then be used for vending products other than those of the bottler.

In the second type of dispenser in which the bottles are arranged in staggered stacks it has been found that six double column staggered stacks side by side is the limit to the practical size of the cooler, doors and the like of the apparatus. The number of selections are therefore limited in a machine of maximum size to six. This is advantageous to the bottler since it limits the number of beverages that can be sold other than those of the bottler. Further, more bottles can be stored in the staggered stack type dispenser than in the shelf type machine which is advantageous. However, in the staggered stack machine, the delivery mechanism is usually motor-driven; it is expensive; and there is always the possibility of a mechanical jam of the mechanism in the automatic, positive drive of the dispensing mechanism for the bottles.

Heretofore it has been proposed to dispense from stacks of articles or bottles less than two diameters of the articles or bottles in width with mechanism for holding the lowermost bottle in the stack first on one side of the stack and then on the other side of the stack. In prior devices some positive external force has been required to move the holding mechanism from one side of the stack to the other side. In the present invention the article or bottle being dispensed moves the holding mechanism and particularly the latching portion thereof to the opposite position to support the next bottle on the opposite side of the stack.

In the dispensing mechanism proposed in the present application the latch is actuated by the weight of the bottle to release the bottle to be dispensed and is moved by the weight of the bottles to position to latch the support for the opposite and next bottle in the stack as opposed to mechanically driving the bottle support from one supporting position to the opposite supporting position thus preventing mechanical jamming of the mechanism. The dispensing mechanism of the present concept is less costly both to make, use and service, and is capable of dispensing at a faster rate. The speed of actuation is advantageous in rush hours, permitting maximum sales. The mechanism of the present concept is simple to service; it eliminates vending errors and is foolproof in operation.

The apparatus of the present concept is actuated in two steps for each bottle dispensed. The stack of bottles is not dropped a full diameter during each vending cycle but is lowered in one quarter diameter stages. This is a very important advantage since it reduces the shock due to the weight of the stack of bottles. Damage to bottles through rough handling is always a problem in vending mechanisms and minimizing such damage is important. Non-return bottles are more fragile than the standard returnable bottle and shock in the dispensing operation must be reduced to a minimum to prevent breakage of such non-return bottles. Lowering the entire stack of bottles in one quarter diameter stages, as in the present concept, is therefore important when the apparatus is dispensing non-return bottles. Further, the compact and light weight character of the present dispensing apparatus permits the assembly to be resiliently mounted so that the column of bottles never actually drops in the true sense of the word. The entire assembly rises to meet the descending column of bottles when a bottle is dispensed.

In staggered stack vending devices now in use, it is imperative in loading the apparatus with bottles or articles to be dispensed that the bottles or articles be arranged in the stack in proper sequence depending upon the position of the dispensing mechanism. Otherwise the dispensing mechanism will jam. Such is not the case in the present concept where the mechanism automatically supports the lowermost bottle in the stack and the mechanism cannot be jammed by out of sequence loading of the bottles.

Heretofore various devices have been proposed for dispensing a single bottle at a time from a staggered stack of bottles but in none of these has the weight of the bottles been employed to actuate the dispensing mechanism with control of the mechanism effected through electrically energized means. In the prior art devices electric motors or other positive mechanical driving devices have been used for moving supports from beneath the lowermost bottle in a staggered stack of bottles and into position to receive and to retain the remainder of the bottles in the staggered stack when the lowermost bottle is dispensed. Devices of this type are expensive to manufacture and to maintain and are subject to jamming because of the positive drive required to actuate the bottle supports.

In the present dispenser, on the other hand, when a coin is deposited or the switch in the electric circuit momentarily closed, a short pulse of electric current passes to the electrically energized means which suffices to actuate this means. This means then lifts a latch which in turn releases a rock plate rocking a support beneath the lowermost bottle. The support beneath the lowermost bottle in the stack of bottles then moves the rock plate to position to lock an opposite bottle support. The lowermost bottle then moves to dispensing position and the stack of bottles moves downwardly until the next bottle in the stack of bottles engages the opposite bottle support. Only one bottle is dispensed. Thereafter, the return of the first support to its upper and bottle supporting position again momentarily energizes the electrically energized means to lift the latch to permit the weight of the bottles in the stack to return the dispensing mechanism to its standby position.

This cycle can be repeated as many times as there are bottles in the staggered stack of bottles so long as each cycle is started by the deposit of a coin or by the momentary closing of a switch in the electric circuit for the electrically energized means. The use of spaced oppositely disposed supports for alternately supporting the lowermost bottle in the staggered stack of bottles, and thus supporting the entire stack of bottles, with a rock plate moved from one support locking position to the other under the weight of the bottles permits the stack of bottles to be arranged initially without regard to the positioning of the lowermost bottle of the stack since the weight of the lowermost bottle will automatically move the rock plate to position to rock the bottle support beneath that bottle.

The electrically energized or actuated means may be a solenoid, an electric motor or other suitable electrically actuated device for lifting the latch.

It is therefore an object of the present invention to provide a novel dispensing mechanism for dispensing one at a time a single article such as a bottle from a staggered stack of articles or bottles which mechanism is actuated by the weight of the articles or bottles in the staggered stack and is released for dispensing a single article or bottle at a time by electrically energized means actuating a latch.

Another object of the present invention is to provide such a dispensing mechanism in which the electrically energized means is a solenoid which is momentarily actuated on the deposit of a coin or by the momentary closing of a switch in its circuit to raise a latch to permit a support beneath the lowermost bottle in the stack to swing downwardly under the weight of the bottles to dispense the lowermost bottle in the stack while the next bottle in the stack engages an oppositely disposed support which prevents that bottle from being dispensed and supports all of the remaining bottles in the stack with the mechanism so arranged that when the first support, after permitting a bottle to be dispensed, returns to its upper position the solenoid is again momentarily energized to lift the latch and permit the dispensing mechanism to return to its standby position.

Another object of the present invention is to provide such a dispensing mechanism having spaced opposed pivoted supports for alternately supporting the bottles in the stack using the weight of the lowermost bottle and of the bottles thereabove in the stack to move the support adjacent the lowermost bottle downwardly into engagement with a stop mechanism which is locked in position by a solenoid actuated latch which latch is released when the solenoid is momentarily energized, as by the deposit of a coin or by the momentary closing of a switch in the solenoid circuit, to permit the weight of the bottles in the stack to move the adjacent support downwardly and move the stop from beneath the support so that the support may swing to position to dispense the lowermost bottle with the remainder of the bottles then being supported by the new lowermost bottle which engages the opposite support which is prevented from dispensing movement by the stop so that after dispensing the first bottle the first support can return to its support position by the action of a spring and when reaching its support position the first support closes a circuit which momentarily energizes the solenoid to actuate the latch to permit the dispensing device to return to its standby position.

Other and further objects of the present invention will appear from the following description of illustrative embodiments thereof.

The illustrative embodiments of the present invention described hereinafter should in no way be construed as defining or limiting the invention and reference should be had to the appended claims to determine the scope of the present inventive concept.

In the accompanying drawings, in which like reference characters indicate like parts, FIG. 1 is a front view of an embodiment of the present invention showing the relative position of the parts thereof when there are no bottles in the device;

FIG. 2 is a view partly in section of the embodiment of FIG. 1 on the line 2—2 thereof;

FIG. 6 is a view of the embodiment of FIG. 1 after the lower left bottle in the staggered stack has been dispensed and the left hand support has returned to its upper position;

FIG. 7 is a view of the embodiment of FIG. 1 with the lower right bottle of the staggered stack of bottles supported on the right support prior to dispensing thereof;

FIG. 8 is a front view of another embodiment of the dispensing mechanism of the present invention shown without bottles therein;

FIG. 9 is a view partly in section on the line 9—9 of FIG. 8; and

FIG. 10 is a schematic circuit diagram for the solenoid release mechanism of the embodiments of FIGS. 1 and 8.

Figure 3:
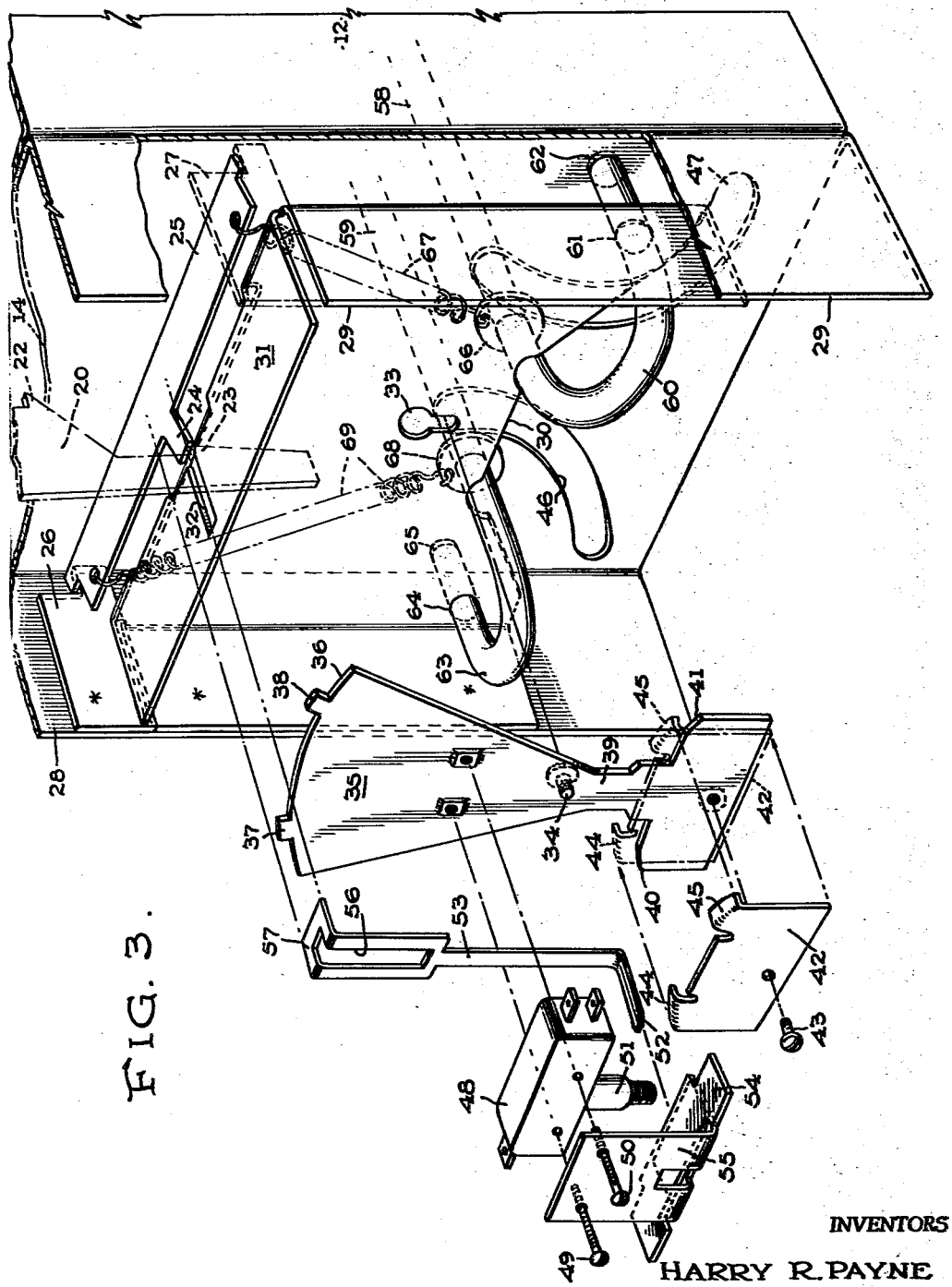
FIG. 3 is an exploded view showing the several elements of the dispensing mechanism of the embodiment of FIG. 1.

Referring now more particularly to FIGS. 1, 2 and 3, a bin for the staggered stack of bottles is provided having side walls 11 and 12 which are spaced and supported by end walls 13 and 14. Side walls 11 and 12 are spaced apart less than twice the diameter of the bottles to be dispensed so that the bottles will lie between walls 11 and 12 in staggered stack in known manner as is more clearly seen in FIGS. 4–7. End walls 13 and 14 are spaced to accommodate the length of the bottles to be dispensed as is apparent in FIG. 2. A bracket 15 is mounted in the upper central portion of wall 14 and supports solenoid 16 which is provided with armature 17. Armature 17 has a rigid head 18 which in lowermost position engages inturned portion 19 of bracket 15. Arm 20 is pivotally mounted on armature 17 at 21 and has shoulder 22 for engagement with the underside of inturned portion 19 for purposes which will appear more fully hereinafter. Arm 20 is provided with a latch engaging shoulder 23 which in its lowermost position lies beneath latch 24.

Latch 24 is carried by cross plate 25 which is mounted for rotation in notches formed in pads 26 and 27 which are mounted, respectively, on extensions 28 and 29 of side walls 11 and 12.

A face plate 30 extends between extensions 28 and 29 and is spaced from front plate 14 and lies beneath cross plate 25. Face plate 30 is provided with a horizontally turned upper extension 31 which is slotted at 32 to guide arm 20. Face plate 30 is slotted adjacent its central lower portion at 33 to receive pivot 34 of rocking stop plate 35. Rock plate 35 has an arcuate upper edge 36 which is provided with spaced upstanding stops 37 and 38. In standby position latch 24 lies between stops 37 and 38. Rock plate 35 is reduced in width below pivot 34 to form shank 39. Beneath shank 39 rock plate 35 is widened to provide shoulders 79 and 80 and shoulders 40 and 41. Tumbler plate 42 is pivoted at 43 on shank 39 and has inturned portions 44 and 45 overlying and spaced from shoulders 40 and 41, respectively.

In the position shown in FIG. 1 portions 44 and 45 overlie arcuate slots 46 and 47, respectively, which slots are let into front plate 14.

A suitable electric switch 48 is mounted on the face of rock plate 35 by through bolts 49 and 50. Switch 48 is provided with an actuator 51 which is engaged by toe 52 of switch arm 53 and also by plate 54 which is held in position beneath actuator 51 by bracket 55 which is secured to switch 48 by bolts 49 and 50. Arm 53 passes between switch 48 and rock plate 35 for free vertical movement and is provided with an upper slotted portion 56 which has an inturned extension 57. Latch 24 extends through slot 56 and when raised engages the underside of extension 57 as will appear more fully hereinafter.

A bottle support rod 58 extends the full length of the device being journaled in back 13 and extending through arcuate slot 47. Rod 58 is provided with U-turned end portion 60 which is journaled in face plate 30 at 61 extending to adjacent front 14 at 62.

An opposed bottle support rod 59 extends through arcuate slot 46 and is provided with a U-turned outer end 63 which is journaled at 64 in face plate 30 and extends to adjacent front 14 at 65. Rod 58 is provided with a collar 66 located between front 14 and face plate 30 and spring 67 extends between collar 66 and cross plate 25 to resiliently hold rod 58 in its upper position and to hold latch 24 down against arcuate surface 36. Rod 59 is provided with collar 68 located between front 14 and face plate 30 and spring 69 extends between the collar 68 and cross plate 25 to resiliently hold rod 59 in its upper position and to hold latch 24 in engagement with arcuate surface 36.

With reference to FIG. 10, a schematic circuit diagram is there shown for solenoid 16 and for switch 48 which includes electric lead 70 from any suitable source of electric current which connects by wire 71 to one side of switch 48. Wire 72 leads from the other side of switch 48 to one side of solenoid 16 and lead 73 connects from the other side of the source of electric current to the other side of solenoid 16. A suitable switch 74 connects lead 70 to the first side of solenoid 16. Switch 74 is preferably coin actuated for momentary closure or may be manually actuated. Switch 48 is normally opened. Switch 74 may be at some distance from solenoid 16 and is connected to it by wire 75.

Referring now to FIGS. 4, 5, 6 and 7, the operation of the embodiment of FIG. 1 utilizing the circuit of FIG. 10 will now be described.

Figure 4:
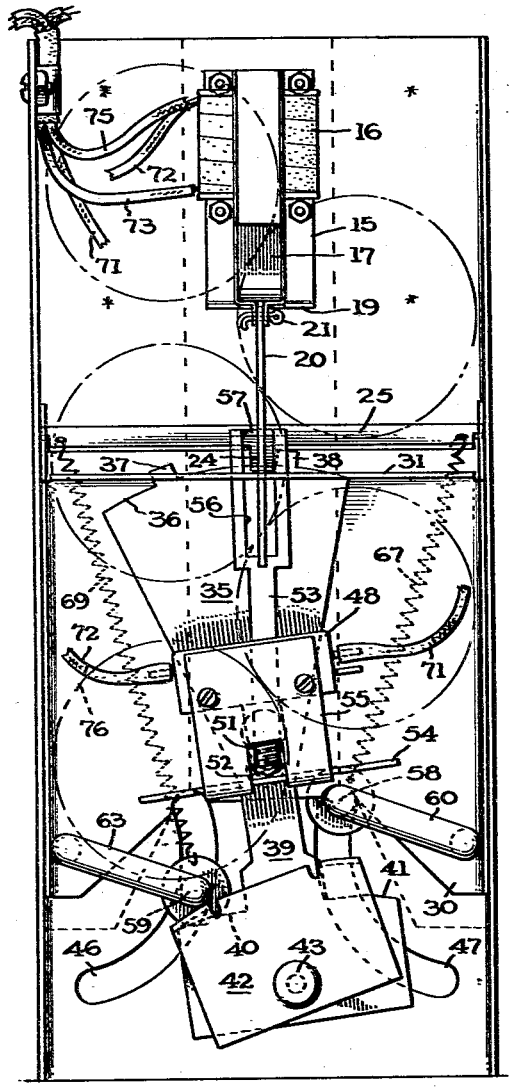
FIG. 4 is a view of the embodiment of FIG. 1 with bottles in staggered stack therein with the lowermost bottle of the staggered stack supported by the left support.
Figure 5:
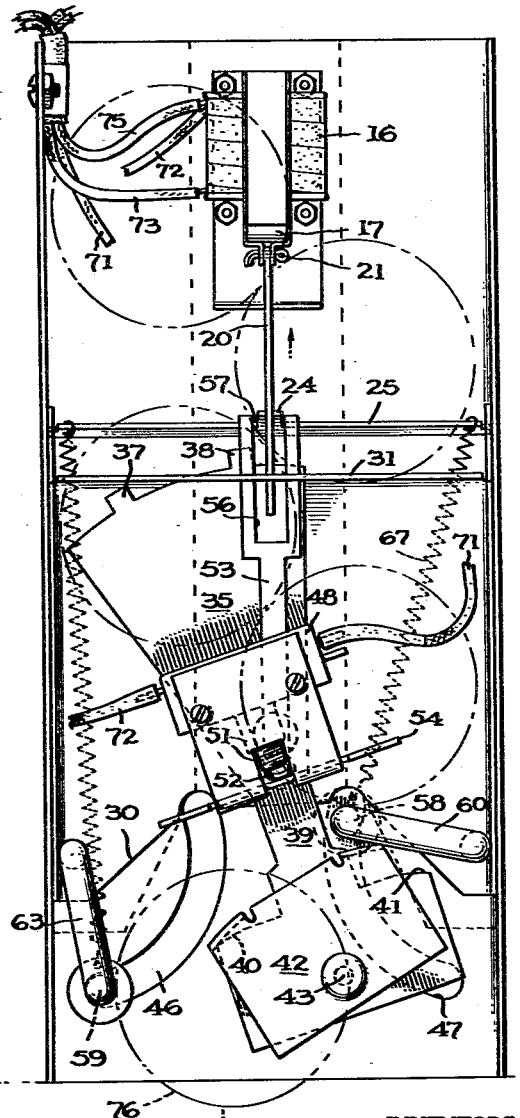
FIG. 5 is a view of the device of FIG. 1 in position dispensing the lower left bottle of the staggered stack.

When a coin is placed in the mechanism in known manner, switch 74 is closed momentarily, or switch 74 may be manually closed momentarily, and an electric circuit is completed from lead 70 through switch 74 and wire 75 to coil 16 is then completed through lead 73. Energizing coil 16 draws armature 17 upward and with it arm 20. Shoulder 23 of arm 20 is engaged beneath latch 24 and raises latch 24. Assuming that in the staggered stack of bottles in the mechanism the lowermost bottle is on the left side, as seen in FIGS. 4 and 5, and is there indicated as 76, the weight of the bottles in the staggered stack will bear upon bottle 76 and upon support 59 moving support 59 downward in slot 46 into engagement with surface 44 of tumbler plate 42 rotating rock plate 35 counter-clockwise until stop 38 is against latch 24. When latch 24 is raised by solenoid 16, as just described, stop 38 moves beneath latch 24 with counter-clockwise rotation of rock plate 35 about pivot 34 and rod 59 slips downward off of surface 44, as seen in FIG. 5, to permit bottle 76 to drop downward to be dispensed.

Energization of solenoid 16 moves armature 17 upward and this movement continues until shoulder 22 of arm 20 strikes inturned portion 19 of bracket 15 and further upward movement then rotates arm 20 in a clockwise direction, as seen in FIG. 3, disengaging shoulder 23 from latch 24. Springs 67 and 69 then snap latch 24 downward onto arcuate surface 36 on the right side of stop 38 as seen in FIG. 6.

The lowermost bottle in the stack of bottles in the mechanism is now the lower right bottle shown at 77. This bottle moves downwardly under its own weight and under the weight of the bottles in the stack thereabove onto rod 58 forcing rod 58 downward in arcuate slot 47 and into engagement with surface 80 adjacent shank 39, as seen in FIG. 6. Rock plate 35 cannot rotate in a clockwise direction around pivot 34 under the weight of the bottles on rod 58 because latch 24 is lodged against the right side of stop 38. At this time spring 69 lifts rod 59 upwardly in slot 46 to its uppermost position, rocking tumbler plate 42 out of the way as it passes, and brings rod 59 into engagement with bar 54 lifting bar 54 and closing switch 48.

Closing switch 48 connects lead 70 through wire 71 and through switch 48 with wires 72 and 75 to coil 16 and the circuit from coil 16 is then completed through lead 73. This energization of coil 16 raises armature 17 and arm 20 to again lift latch 24 above stop 38. The weight of the stack of bottles resting on rod 58 which now bears on surface 45 of tumbler plate 42 (FIG. 7) rotates rock plate 35 in a clockwise direction, bringing stop 38 under latch 24. In the meantime, shoulder 22 of arm 20 has again engaged projection 19 and has been rotated in a clockwise direction, as seen in FIG. 3, to release latch 24. As soon as stop 38 is moved in clockwise direction clear of latch 24 springs 67 and 69 snap latch 24 downwardly into engagement with arcuate surface 36 between stops 37 and 38 and clockwise rotation of rock plate 35 continues until stop 37 brings up against latch 24 as seen in FIG. 7.

The mechanism is now in standby position to dispense the lower right bottle 77. When switch 74 is again momentarily closed, latch 24 will be lifted so that stop 37 may pass thereunder in a clockwise direction; latch 24 is then freed from arm 20, as above described, and the action of springs 67 and 69 will then snap latch 24 down onto arcuate surface 36 to the left of stop 37. In the meantime the weight of the bottles in the stack bearing on rod 58 has swung rod 58 downward with the rotation of rock plate 35 moving surface 45 away from rod 58 so that rod 58 can swing to the lower extremity of slot and dispense bottle 77.

The next bottle in the stack of bottles on the left side, shown at 78, then moves down with the remainder of the stack bottles onto rod 59 forcing rod 59 downward against surface 79 adjacent shank 39. Rock plate 35 cannot at this time rotate in a counter-clockwise direction because latch 24 is engaged behind the left edge of stop 37. Bar 58 is now brought upwardly by its spring 67, moving tumbler plate 42 out of its way in passing, and into engagement with plate 54, again closing switch 48, as above described, to again energize solenoid 16 to lift latch 24. Stop 37 then moves under latch 24 in a counter-clockwise direction. Latch 24 is almost instantaneously released from arm 20, as above described, and, as soon as stop 37 moves from beneath latch 24 in a counter-clockwise direction, springs 67 and 69 snap latch 24 downward into engagement with the arcuate surface 36 between stops 37 and 38 so that the mechanism assumes the position shown in FIG. 4.

Tumbler plate 42 provides a bearing surface for rods 58 and 59 when these rods are supporting, in turn, the weight of the bottles in the stack and permits return of the rod which has moved to dispensing position back to its upward position to engage plate 54, the rod in its upward movement rocking tumbler plate 42 out of the way as it passes upwardly.

Switch arm 53 insures that an adequate pulse of current passes through solenoid 16 to lift latch 24. When solenoid 16 is energized armature 17 moves upward moving arm 20 with it and lifting latch 24. Latch 24 engages under projection 57 of arm 53 and raises arm 53 thus lifting toe 52 thereof which closes switch 48 through actuator 51 to complete a circuit to coil 16 through switch 48. Armature 17 is then brought to its extreme upward position so that arm 20 and its shoulder 23 are moved out of engagement with latch 24. As soon as latch 24 is released by arm 20 and when clear of stop 37 or 38, latch 24 snaps downwardly and arm 53 moves down by gravity to open switch 48.

The embodiment of the present invention shown in FIGS. 8 and 9, now to be described, has a similar cycle of operation to that of the embodiment of FIGS. 1–7 but has a rearrangement of the elements and parts which may be preferred in some commercial installations. In the embodiment of FIGS. 8 and 9, the support rods are resiliently mounted in a resilient mounting for the entire solenoid actuated release mechanism which resilient mounting absorbs much of the impact and shock inherent in the dispensing of one bottle and the movement of the stack of bottles downward thereafter into engagement with the appropriate support rod. Further in the embodiment of FIGS. 8 and 9, the solenoid and its switch corresponding to switch 48 are mounted adjacent each other with the switch corresponding to switch 48 fixed in position and not mounted on the rock plate. In this embodiment the arm corresponding to arm 53 is spaced from the rock plate to eliminate friction therebetween and to insure an easy and positive action of both of these elements. The arm corresponding to arm 20 is spring loaded for positive return to initial position for engaging the latch and tumbler plate 42 is divided into two elements, each individually pivoted and spring loaded on the rock plate. The springs corresponding to springs 67 and 69 are now secured at their upper ends to the side walls and not to the cross plate corresponding to plate 25 since the actuator for the switch is spring loaded above and engages the latch through the upper end of the switch arm as will appear more fully hereinafter.

In the embodiment of FIGS. 8 and 9, the bin for the bottles has side walls 81 and 82 and a back wall, not shown. Inturned shoulders 83 and 84 extend from side walls 81 and 82, respectively, and cross plate 85 extends therebetween and is fastened thereto to constitute the front wall of the bin. Front plate 86 is provided with a forwardly extending top portion 87 and with forwardly extending side portions 88 and 89 and is mounted for free vertical movement within side walls 81 and 82 in front of and bearing against shoulders 83 and 84. A resilient suspension for front plate 86 and the elements of the release mechanism, to be described, as well as a resilient support for the bottles in the stack is provided by bolts 90 and 91 which extend through portion 87 and through cross plate 85 with spacers 92 and 93 therebetween. Spring 94 surrounds bolt 90 and bears against cross plate 85 and against a washer and nut 95 on bolt 90. Spring 96 surrounds bolt 91 and bears against cross plate 85 and against a washer and nut 97 on bolt 91. Springs 94 and 96 are under compression to provide a resilient support for the bottles and for the bottle supporting and dispensing structure.

Coil 98 is mounted on face plate 86 and is provided with armature 99 to which arm 100 is pivoted at 101. Arm 100 is provided with a latch engaging shoulder 102. Switch 103 is mounted beneath coil 98 on face plate 86 and as provided with a spring loaded actuator 104. A forked support for switch 103 provides a guide for arm 100 at 105. Arm 100 is provided with an extension 106 which rides in a slot 107 in face plate 86 and is so arranged that, when brought into engagement with the upper end of slot 107, arm 100 is rotated in a clockwise direction as seen in FIG. 9 to rotate shoulder 102 out of engagement with the latch.

A hollow wedge-shaped housing 108 is mounted on face plate 86 by its out turned flanges 109 and 110 and is provided with a circular opening 111 in its face. A cross plate 112 carrying latch 113 rests loosely on the top of housing 108 and is prevented from excessive movement by inturned clips 114 and 115.

Switch arm 116 extends downwardly within housing 108 and has slot 117 at its upper end through which latch 113 extends. A cross piece 118 is pivoted to arm 116 at 119 for engagement by the bottle support rods. Rock plate 120 is pivoted at 121 to housing 108 and is provided with spaced stops 122 and 123 on its upper arcuate edge 124. Rock plate 120 is provided with opening 125 to permit spring 126 to extend between the lower end of arm 100 and the lower portion of circular opening 111.

Rock plate 120 is reduced in width at 127 to provide shoulders 128 and 129. Tumbler 130 is pivoted at 131 to rock plate 120 and has surface 132 thereof adjacent surface 128. Tumbler 133 is pivoted at 134 to rock plate 120 and has surface 135 thereof adjacent surface 129. A spring 136 extends between tumblers 130 and 133 and urges them against stop 137 carried by rock plate 120.

Plate 86 is provided with opposed arcuate slots 138 and 139. Bottle support rod 140 extends through slot 138 and is provided with a U-turned end 141 which is journaled for rotation in bracket 142 secured to extension 88 of plate 86. Spring 143 extends between end 141 and extension 88 to hold rod 140 resiliently in the upper end of slot 138.

Bottle support rod 144 extends through slot 139 and is provided with U-turned end 145 which is journaled for rotation in bracket 146 secured to extension 89. Spring 147 extends from end 145 to extension 89 to hold rod 144 resiliently in the upper end of slot 139.

Guides 148 and 149 are carried by housing 108 and extend outwardly beside latch 113 and downwardly over the upper edge of rock plate 120 to control the movement of latch 113 and to insure proper engagement of stops 122 and 123 with latch 113.

The electric circuitry for coil 98 and for switch 103 is identical to that described above with respect to FIG. 10 and need not be repeated.

When coil 98 is energized by the closing of the coil or manually actuated switch a pulse of current lifts armature 99 and arm 100 against the action of spring 126 lifting latch 113 to free whichever of stops 122 or 123 is in engagement therewith. Extension 106 of arm 100 engaging the top of slot 107 moves shoulder 102 away from latch 113 allowing latch 113 to return to engagement with arcuate surface 124 of rock plate 120 on the other side of the released stop 122 or 123 with rock plate 120 being moved by the weight of the stack of bottles upon the appropriate rod 140 or 144. The weight of the bottles on the appropriate rod 140 or 144 swings rock plate 120 to the position where the rod 140 or 144 can slip over its associated tumbler 130 or 133 to dispense the bottle.

Upon the dispensing of a bottle, the stack of bottles is lowered to bring the next lowermost bottle into engagement with the other of the supporting rods 140 or 144 and the shock of the downward movement of bottles into engagement with that rod is absorbed by springs 94 and 96. The weight of the stack of bottles now on the other supporting rod rotates rock plate 120 in the opposite direction so that the returning support rod moved upward by its spring must rotate its associated tumbler on its pivot against the action of spring 136 before it can return to the upper end of its arcuate slot and into engagement with cross piece 118. Engagement with cross piece 118 raises arm 116 and plunger 104 to close switch 103 to again energize coil 98. Latch 113 is again lifted permitting rock plate 120 to rotate so that latch 113 may return to engagement with arcuate edge 124 between stops 122 and 123 thereby placing the mechanism in standby position and ready for the next dispensing cycle.

It should now be apparent to those skilled in the art that the present invention in every way satisfies the several objectives discussed above.

Changes in or modifications to the above-described illustrative embodiments of this invention may now be suggested to those skilled in the art without departing from the present inventive concept. It is apparent, for example, that an electric motor or other suitable device may be substituted for the solenoid for raising the latch. Other articles than bottles may be dispensed by the described mechanisms and it is to be understood that all such articles are to be considered as included in the definition of a bottle or bottles in the following claims. Reference should therefore be had to the appended claims to determine the scope of this invention.

What is claimed is:

1. In a mechanism for dispensing a single bottle at a time from a staggered stack of bottles in a bin, two opposed bottle supports adjacent the lower end of the bin mounted for downward rotary movement from an upper normal position to bottle dispensing position and supporting in turn the lowermost bottle of the stack of bottles in the bin, latch means for said supports mounted for oscillating movement with respect to said bin and engaging and holding the support engaged by the lowermost bottle against downward rotation when the mechanism is in standby condition, spaced stops on said latch means, a latch normally disposed between said stops preventing movement of said latch means, said latch means being rotated in one direction by the weight of the bottles to engage said latch and one of said stops, means for removing said latch from between said stops thereby freeing said latch means for oscillating movement in said one direction whereby the weight of the bottles rotates the bottle support beneath the lowermost bottle in the stack downward to bottle dispensing position and moves said latch means beneath the other bottle support preventing downward rotation thereof, said latch engaging said one of said stops to prevent movement of said latch means in the opposite direction, and means actuated by the return of a bottle support from bottle dispensing position to its normal position for actuating said latch removing means for releasing said latch from said one of said stops freeing said latch means for movement to said standby condition with said latch between said stops.

2. Mechanism as described in claim 1, in which said latch means comprises a rock plate mounted for oscillating movement generally at right angles to the direction of movement of said supports, opposed shoulders on said plate each engaging in turn the adjacent one of said supports when the adjacent one of said supports first receives the weight of the bottles, and an upper arcuate edge on said rock plate, said stops extending from said arcuate edge in the plane of said rock plate.

3. In mechanism as described in claim 2, a tumbler plate mounted for limited oscillating movement adjacent said shoulders on said rock plate, and portions on said tumbler plate forming extensions of said shoulders, one of said portions extending beneath and supporting the bottle support having the weight of the stack of bottles thereon when the mechanism is in standby condition, said tumbler plate being engaged by and rotated out of the path of the bottle support returning to its upper normal position.

4. Mechanism as described in claim 3 including resilient means for holding said supports in their upper normal positions.

5. Mechanism as described in claim 1, said latch removing means including a solenoid, an armature for said solenoid, an arm pivoted on said armature, a shoulder on said arm normally engaged beneath said latch and trip means rotating said arm out of engagement with said latch when said arm is moved by said solenoid and has moved said latch from said stops.

6. Mechanism as described in claim 1, said last named means including electric switch means operatively connected to said latch removing means, an actuator for said switch means, a plate operatively connected to said actuator engaged by the bottle support returning to normal upper position to close said switch means, a switch arm moved by movement of said latch and a toe on said switch arm engaging said actuator.

7. Mechanism as described in claim 4, said latch removing means including a solenoid, an armature for said solenoid, an arm pivoted on said armature, a shoulder on said arm normally engaged beneath said latch and trip means rotating said arm out of engagement with said latch when said arm is moved by said solenoid and has moved said latch from said stops.

8. Mechanism as described in claim 7, including electric switch means connected to said solenoid, an actuator for said switch means, a plate operatively connected to said actuator engaged by the bottle support returning to normal upper position to close said switch means, a switch arm moved by movement of said latch and a toe on said switch arm engaging said actuator.

9. In a mechanism as described in claim 8, the bin having spaced side walls and spaced front and back walls, a plate extending between the side walls and spaced from and in front of the front wall, journals in said plate for said bottle supports, arcuate slots in the front wall, said bottle supports extending through said arcuate slots, journals for said supports in the back wall, a pivot on said plate mounting said rock plate and means for spacing said electric switch means from and for securing said electric switch means to said rock plate.

10. Mechanism as described in claim 9, said latch being journaled for rotation between the side walls and said switch arm extending between said electric switch means and said rock plate.

11. A mechanism for dispensing a single bottle at a time from a staggered stack of bottles in a bin having spaced side walls and spaced front and back walls, comprising two opposed bottle supports adjacent the lower end of the bin mounted for downward rotary movement from an upper normal position to bottle dispensing position and supporting in turn the lowermost bottle of the stack of bottles in the bin, a plate resiliently mounted between the side walls and in front of the front wall of the bin, journals on said plate for said supports, journals on the rear wall of the bin for said supports, a housing spaced from and mounted on said plate adjacent said supports, a pivot on said housing, a rock plate mounted on said pivot, opposed shoulders on said rock plate each engaging in turn the adjacent one of said supports when the adjacent one of said supports first receives the weight of the bottles, a tumbler pivotally mounted on said rock plate adjacent each of said shoulders and forming extensions thereof, resilient means holding each of said tumblers in position extending its adjacent shoulder, each of said tumblers in turn being engaged by and rotated out of the path of the adjacent bottle support returning to its upper normal position, spaced stops on said rock plate, a latch normally disposed between said stops preventing movement of said rock plate, means mounted on said plate for removing said latch from between said stops thereby freeing said rock plate for movement whereby the weight of the bottles rotates the bottle support beneath the lowermost bottle in the stack downward to bottle dispensing position and rotates the adjacent shoulder of said rock plate beneath the other bottle support preventing downward rotation thereof and means actuated by the return of a bottle support from bottle dispensing position to its upper normal position for actuating said latch removing means for releasing said latch from a said stop freeing said rock plate for movement to normal position with said latch between said stops.

12. Mechanism as described in claim 11, including spring means resiliently holding said supports in upper position, said latch removing means comprising a solenoid, an armature for said solenoid, an arm pivoted to said armature, a shoulder on said arm normally engaged beneath said latch, trip means rotating said arm out of engagement with said latch when said arm has moved said latch from said stops, and spring means resisting movement of said arm by said solenoid.

13. Mechanism as described in claim 12, including an electric switch connected to said solenoid, an actuator for said switch moved by said latch when moved to released position for closing said switch, and a switch arm engaging said actuator and extending through said housing for engagement and movement by the bottle support returning to its upper normal position.

14. Mechanism as described in claim 13 including an upper arcuate edge on said rock plate, said stops extending from said arcuate edge in the plane of said rock plate, said latch being mounted for rotary movement on said housing.

References Cited in the file of this patent

UNITED STATES PATENTS

| | | |
|---|---|---|
| 2,435,526 | Young et al. | Feb. 3, 1948 |
| 2,825,488 | Nelson | Mar. 4, 1958 |
| 2,835,409 | Rankin | May 20, 1958 |
| 2,878,961 | Voorhees et al. | Mar. 24, 1959 |